United States Patent
Dronamraju et al.

(10) Patent No.: US 11,477,753 B2
(45) Date of Patent: Oct. 18, 2022

(54) GEOGRAPHICAL SPECIFICATION BASED IDENTIFICATION OF COMPONENTS OF A WIRELESS LOCAL AREA NETWORK

(71) Applicant: Hewlett Packard Enterprise Development LP, Houston, TX (US)

(72) Inventors: Sameer Dronamraju, Bangalore (IN); Sekhar Karimbedu, Bangalore (IN); Srinivasan Chandrasekaran, Bangalore (IN); Sreecharan Guduri, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 878 days.

(21) Appl. No.: 15/663,109

(22) Filed: Jul. 28, 2017

(65) Prior Publication Data
US 2019/0037523 A1    Jan. 31, 2019

(51) Int. Cl.
| | |
|---|---|
| *H04W 80/12* | (2009.01) |
| *H04W 64/00* | (2009.01) |
| *H04W 4/02* | (2018.01) |
| *H04W 16/18* | (2009.01) |
| *H04W 4/021* | (2018.01) |

(Continued)

(52) U.S. Cl.
CPC ........... *H04W 64/003* (2013.01); *H04L 45/02* (2013.01); *H04L 65/1101* (2022.05); *H04L 67/04* (2013.01); *H04W 4/021* (2013.01); *H04W 4/026* (2013.01); *H04W 16/18* (2013.01); *H04W 80/12* (2013.01); *H04L 43/045* (2013.01)

(58) Field of Classification Search
CPC ....... H04L 41/024; H04L 41/20; H04L 45/02; H04L 65/10; H04L 29/06183; H04L 67/04; H04W 80/12
See application file for complete search history.

(56) References Cited

U.S. PATENT DOCUMENTS

| | | |
|---|---|---|
| 6,747,957 B1 | 6/2004 | Pithawala et al. |
| 8,421,618 B2 | 4/2013 | Scalisi et al. |
| (Continued) | | |

FOREIGN PATENT DOCUMENTS

| | | |
|---|---|---|
| CN | 101951551 A | 1/2011 |
| CN | 102291799 A | 12/2011 |
| (Continued) | | |

OTHER PUBLICATIONS

InterpretAir WLAN Survey, User Guide, Nov. 2005, pp. 1-68 (Year: 2005).*

(Continued)

*Primary Examiner* — Salvador E Rivas
(74) *Attorney, Agent, or Firm* — Hewlett Packard Enterprise Patent Department

(57) ABSTRACT

Some examples relate to identifying components of a wireless local area network based on a geographical specification. In an example, a connection may be established between a client device and a wireless access point (WAP) in a wireless local area network (WLAN) comprising a plurality of WAPs. The client device may transmit a geographical specification to a range monitoring engine. The range monitoring engine may identify a component of the WLAN based on the geographical specification and a first set of geographical coordinates of the WAP acting as a reference point.

20 Claims, 4 Drawing Sheets

(51) Int. Cl.
  *H04L 67/04* (2022.01)
  *H04L 45/02* (2022.01)
  *H04L 65/1101* (2022.01)
  *H04L 43/045* (2022.01)

(56) References Cited

U.S. PATENT DOCUMENTS

| | | |
|---|---|---|
| 9,444,929 B2 | 9/2016 | Hodges et al. |
| 2004/0057408 A1 | 3/2004 | Gray |
| 2007/0081477 A1 | 4/2007 | Jakkahalli et al. |
| 2008/0051068 A1* | 2/2008 | Frew .............. H04W 4/029 455/414.1 |
| 2014/0064258 A1* | 3/2014 | Montag ............ H04W 84/12 370/338 |
| 2014/0245167 A1 | 8/2014 | Ringer et al. |
| 2014/0335839 A1 | 11/2014 | Rubin et al. |
| 2016/0021503 A1 | 1/2016 | Tapia |
| 2016/0212685 A1 | 7/2016 | Talukdar et al. |
| 2016/0219556 A1* | 7/2016 | Kim ................. H04W 48/16 |
| 2016/0234808 A1* | 8/2016 | da Silva ............. H04W 48/18 |
| 2016/0323706 A1 | 11/2016 | Splaine et al. |

FOREIGN PATENT DOCUMENTS

| | | |
|---|---|---|
| CN | 102572736 A | 7/2012 |
| CN | 102638869 A | 8/2012 |
| CN | 103167538 A | 6/2013 |
| CN | 103796187 A | 5/2014 |
| CN | 105163368 A | 12/2015 |
| CN | 105636174 A | 6/2016 |
| CN | 106170138 A | 11/2016 |
| EP | 2252101 A2 | 11/2010 |
| EP | 2869625 A1 | 5/2015 |

OTHER PUBLICATIONS

InterpretAir WLAN Survey, Users Guide, Nov. 2005, 68 Pgs.
Ashkan Nikravesh et al., "Mobile Network Performance From User Devices: A Longitudinal, Multidimensional Analysis," Mar. 2014, pp. 1-10.

* cited by examiner

GEOGRAPHICAL SPECIFICATION BASED IDENTIFICATION OF COMPONENTS OF A WIRELESS LOCAL AREA NETWORK

BACKGROUND

A wireless local area network (WLAN) is a wireless computer network that links two or more devices using a wireless distribution method (for example, radio or infrared signals). A WLAN is typically implemented within a limited area such as a home, college, school, or an office complex.

BRIEF DESCRIPTION OF THE DRAWINGS

For a better understanding of the solution, embodiments will now be described, purely by way of example, with reference to the accompanying drawings, in which.

DETAILED DESCRIPTION

A WLAN is a wireless local area network that uses radio waves as its carrier. An infrastructure wireless network (for example, in a school or an office building) may include hundreds of client devices, a large number of access points (APs), and a plurality of WLAN controllers. In an example, a WLAN may be monitored via a network management system (NMS), which may be coupled to WLAN controllers. The information (for example, configuration details) related to various access points may be aggregated at a controller(s) which in turn may send it to NMS. NMS may aggregate and store such information. In the event of a network-related issue (for example, a client device access issue), a user may have to analyze a large amount of information related to various components of WLAN to identify the issue and take a corrective action. In all likelihood, a number of these identified components and the information related thereto may have little relation to the issue at hand. Needless to say, this is not a desirable scenario either from the perspective of an end user or an enterprise personnel managing the WLAN, who may end up spending precious time in finding a resolution. It may be technically challenging to filter a large amount of information related to various components (for example, APs, controllers, and connected client devices) of a WLAN to identify information related to a particular component(s).

To address this technical challenge, the present disclosure describes various examples for identifying components of a wireless local area network based on a geographical specification. In an example, a connection may be established between a client device and a wireless access point (WAP) in a wireless local area network (WLAN) comprising a plurality of WAPs. The client device may transmit a geographical specification to a range monitoring engine. The information (for example, interference, attenuation, connection quality, etc.) related to a component of the WLAN may be received from the range monitoring engine. The range monitoring engine may identify the component of the WLAN based on the geographical specification and a first set of geographical coordinates of the WAP acting as a reference point. The information related to the component of the WLAN may be displayed via a user interface coupled to the client device. In an example, based on the information, a user (for example, the local WLAN administrator) may initiate an action (for example, a corrective action) related to a network-related issue. By identifying the relevant components of WLAN based on a defined geographical specification and providing information related thereto, the examples described herein may enable a local administrator to quickly isolate and resolve an issue with a WLAN.

Figure 1:
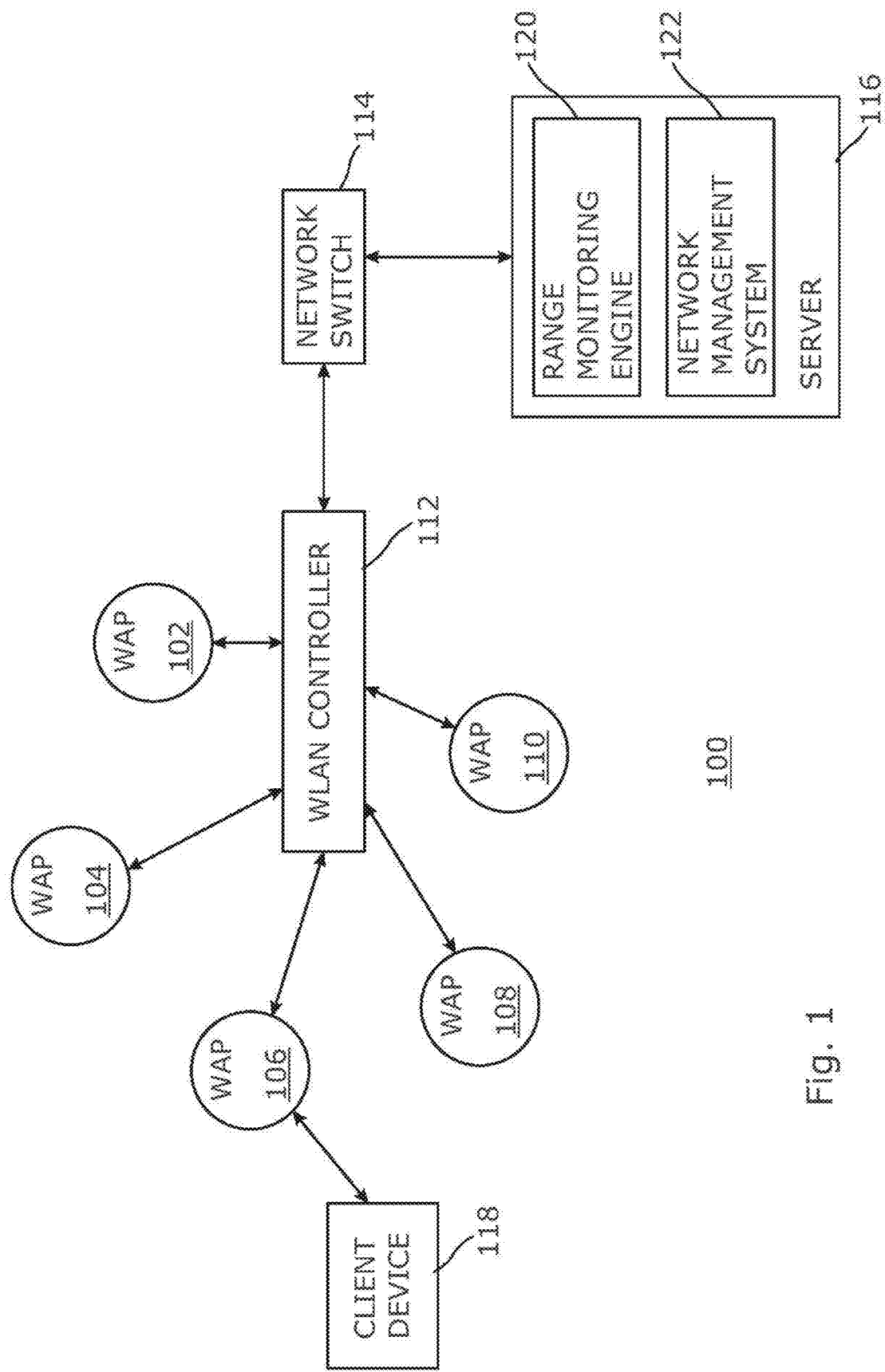
FIG. 1 is a block diagram of an example computing environment for a geographical specification based identification of a component of a wireless local area network.

FIG. 1 is a block diagram of an example computing environment 100 for identifying components of a wireless local area network based on a geographical specification. In an example, computing environment 100 may include a wireless local area network (WLAN). In an example, the WLAN may include an Institute of Electrical and Electronics Engineers (IEEE) 802.11 WLAN. IEEE 802.11 is a set of media access control (MAC) and physical layer (PHY) specifications for implementing wireless local area network (WLAN) computer communication.

Computing environment 100 may include a plurality of wireless access points (WAPs) 102, 104, 106, 108, and 110, a WLAN controller 112, a network switch 114, a server 116, and a client device 118. Although five WAPs, one network switch, one WLAN controller, one server, and one client device are shown in FIG. 1, other examples of this disclosure may include more or less than five WAPs, more than one WLAN controller, more than one network switch, more than one server, and more than one client device.

WAPs 102, 104, 106, 108, and 110 may each include a device, such as a wireless router, that allows a wireless devices (for example, client device 118) to connect to WLAN. WAPs 102, 104, 106, 108, and 110 may each act as radio transmitters for WLAN. WAPs 102, 104, 106, 108, and 110 may each translate network traffic into radio signals and transmit that signal to wireless enabled computers. In an example, WAPs 102, 104, 106, 108, and 110 may each act as a bridge to a wired LAN. In the example of FIG. 1, WAPs may each be connected to a wired network via WLAN controller 112, which in turn may be coupled to a cable in order to allow wireless enabled computers access to a wired network.

WLAN controller 112 may be used to manage traffic (for example, management, data and control) on WLAN. WLAN controller 112 may gather the control plane data and provide instructions to individual WAPs 102, 104, 106, 108, and 110. WLAN controller 112 may be used to manage various aspects related to WAPs. These may include, for example, authentication, radio frequency, authentication, Quality of Service (QoS), location tracking, intrusion detection, facilitate user roaming between APs, deploy security profiles, and segregate access. WLAN controller 112 may enable WAPs to connect to a wired network via network switch 114. Network switch 114 may include a layer 2 or layer 3 switch.

In an example, client device 118 may represent any type of computing device capable of reading machine-executable instructions. Examples of the computing device may include, without limitation, a server, a desktop computer, a notebook computer, a tablet computer, a thin client, a mobile device, a personal digital assistant (PDA), and the like. In an example, client device 118 may include a wireless network interface (for example, a wireless network interface card (NIC)) that enables client device 118 to perform wireless communication with another device (for example, WAPs 102, 104, 106, 108, or 110).

Server 116 may include a computer and/or a computer program (machine-readable instructions) that may process requests from other (client) computers over a network. In an example, server 116 may include a range monitoring engine 120, and a network management system 122. In another example, network management system 122 may be present on a separate device (for example, a computing device or storage device), which may be communicatively coupled to server 116. In an example, range monitoring engine 120 may be present on client device 118. In an example, range monitoring engine 120 may include a mobile application on client device 118.

Range monitoring engine 120 may include any combination of hardware and programming to implement the functionalities of the engine described herein. In examples described herein, such combinations of hardware and software may be implemented in a number of different ways. For example, the programming for the engine may be processor executable instructions stored on at least one non-transitory machine-readable storage medium and the hardware for the engine may include at least one processing resource to execute those instructions. In some examples, the hardware may also include other electronic circuitry to at least partially implement engine 120. In some examples, the at least one machine-readable storage medium may store instructions that, when executed by the at least one processing resource, at least partially implement engine 120. In such examples, server 116 may include the at least one machine-readable storage medium storing the instructions and the at least one processing resource to execute the instructions.

In an example, client device 118 may establish a connection to a wireless access point (WAP) (for example, 106) in a wireless local area network (WLAN) comprising a plurality of access points (for example, WAPs 102, 104, 106, 108, or 110). Client device 118 may connect to WAP 106 using a service set identifier (SSID), which may include a sequence of characters (for example, 0-32 octets) that uniquely identifies the WLAN. In an example, WAPs 102, 104, 106, 108, or 110 may all use the same SSID.). In an example, geographical coordinates (for example, latitude and longitude) of each of the WAPs 102, 104, 106, 108, or 110 may be defined during their respective commissioning in the WLAN, and these coordinates may be stored in network management system 122. In an example, geographical coordinates of the WAP (for example, 106) to which client device 118 establishes a connection may be referred to as a "first set of geographical coordinates".

In an example, client device 118 may transmit a geographical specification to range monitoring engine 120. As used herein, the term "geographical specification" may include a second set of geographical coordinates (for example, longitude and latitude) or a geographical range (for example, in meters or centimeters). In an example, the geographical specification may be predefined. In another example, the geographical specification may be defined by a user (for example, a WLAN administrator) via a user input on client device 118. In an example, the user input may be received via an interface (for example, a web interface) on client device 118. In an example, the second set of geographical coordinates may indicate a location of client device 118.

Client device 118 may transmit the geographical specification to range monitoring engine 120 on server 116. In an example, range monitoring engine 120 may be present on client device 118. In response, range monitoring engine 120 may identify a component(s) of the WLAN based on the geographical specification and a first set of geographical coordinates (for example, latitude and longitude) of WAP 106 acting as a reference point. For example, if the geographical specification defines a geographical range (for example, 100 meters), and a first set of geographical coordinates (for example, latitude and longitude) of WAP 106 are 40'44'55" N 20'24'34" E, range monitoring engine 120 may use WAP coordinates 40'44'55" N 20'24'34" E as a reference point to identify components of WLAN that may be present within 100 meters of these coordinates.

In another example, if the geographical specification defines a second set of geographical coordinates (for example, 38'44'55" N 18'24'34" E), range monitoring engine 120 may use WAP coordinates 40'44'55" N 20'24'34" E as a reference point to identify WLAN components of WLAN present within the geographical coordinates 38'44'55" N 18'24'34" E and 40'44'55" N 20'24'34" E (e.g., within a circular area where the radius is the line between the first set of geographical coordinates and the second set of geographical coordinates). Some non-limiting examples of WLAN components that may be identified by range monitoring engine 120 may include WAPs, WLAN controllers, client devices and network switches.

Subsequent to the identification of a WLAN component present within the defined geographical specification, range monitoring engine 120 may receive and/or obtain information related to the identified component from network management system 122 on server 116. In an example, network management system 122 may be present on a separate computing or storage device, which may be communicatively coupled to server 116. In an example, the information related to an identified component may relate to the performance of the component. Examples of the information related to an identified component may include interference, attenuation, connection quality, speed usage over a time scale, client device authentication statistics, and client device bandwidth usage details.

In an example, range monitoring engine 120 may receive and/or obtain information related to the identified component from Visual RF application (not shown), which may be present on server 116 or on a separate computing or storage device, which may be communicatively coupled to server 116. The Visual RF application may automatically generate maps of a radio frequency (RF) environment and underlying topology, to show what the network looks like in real time. The Visual RF application may build this map using RF measurements gathered from active, authorized wireless access points, controllers, and clients. The Visual RF application may display who is on the WLAN, where they are, and how the network and associated client devices are performing. In an example, the Visual RF application may expose this information via a web interface that displays maps and location information of components in a WLAN. In an example, range monitoring engine 120 may correlate information related to an identified component, which is received or obtained from network management system, with information from the Visual RF application.

Range monitoring engine 120 may provide the information related to an identified component to client device 118. In an example, client device 118 may display the received information, for example, via a user interface coupled to client device 118. A user (for example, a local WLAN administrator) may initiate an action (for example, a corrective action) related to a WLAN-related issue based on the information received on client device. In an example, the action may relate to a component of the WLAN. For example, if the issue relates to authentication of client device 118 in respect of a WAP in the WLAN, the action may include providing fresh authentication details to client device. Some non-limiting examples of other actions that may be initiated through client device 118 may include firmware update of a WAP, relocation of a WAP, disabling or enabling of a WAP, authentication of a SSID, and channel allocation of a WAP.

Figure 2:
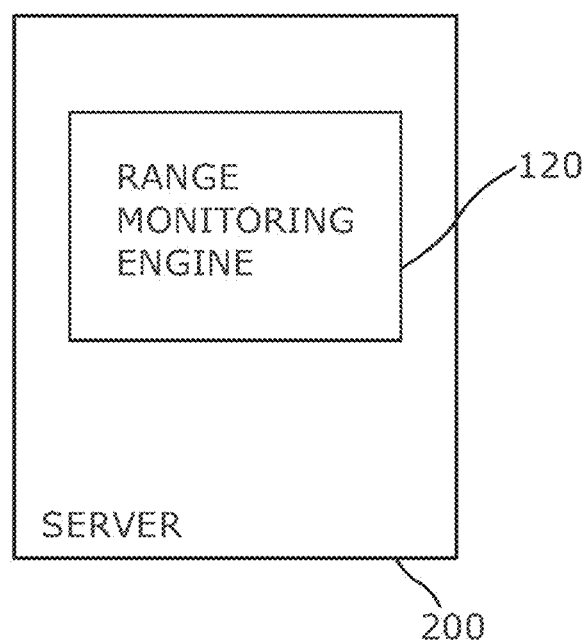
FIG. 2 is a block diagram of an example system for a geographical specification based identification of a component of a wireless local area network.

FIG. 2 is a block diagram of an example system 200 for a geographical specification based identification of a component of a wireless local area network. In an example, system 200 may be analogous to server 116 of FIG. 1, in which like reference numerals correspond to the same or similar, though perhaps not identical, components. For the sake of brevity, components or reference numerals of FIG. 2 having a same or similarly described function in FIG. 1 are not being described in detail in connection with FIG. 2. Said components or reference numerals may be considered alike.

In an example, system 200 may include a range monitoring engine (for example, 120). In an example, the range monitoring engine may receive, from a client device (for example, 118), an input defining a geographical specification. The client device may be coupled to a wireless access point (WAP) in a wireless local area network (WLAN), which may comprise a plurality of access points. The range monitoring engine may identify a component of the WLAN based on the geographical specification and a first set of geographical coordinates (for example, latitude and longitude) of the WAP acting as a reference point. The range monitoring engine may determine information related to the component of the WLAN. In an example, the range monitoring engine may receive and/or obtain information related to the identified component from a network management system. In an example, the range monitoring engine may correlate information related to an identified component, which is received or obtained from network management system, with information from the Visual RF application. The range monitoring engine may provide information related to the component of the WLAN to the client device.

Figure 3:
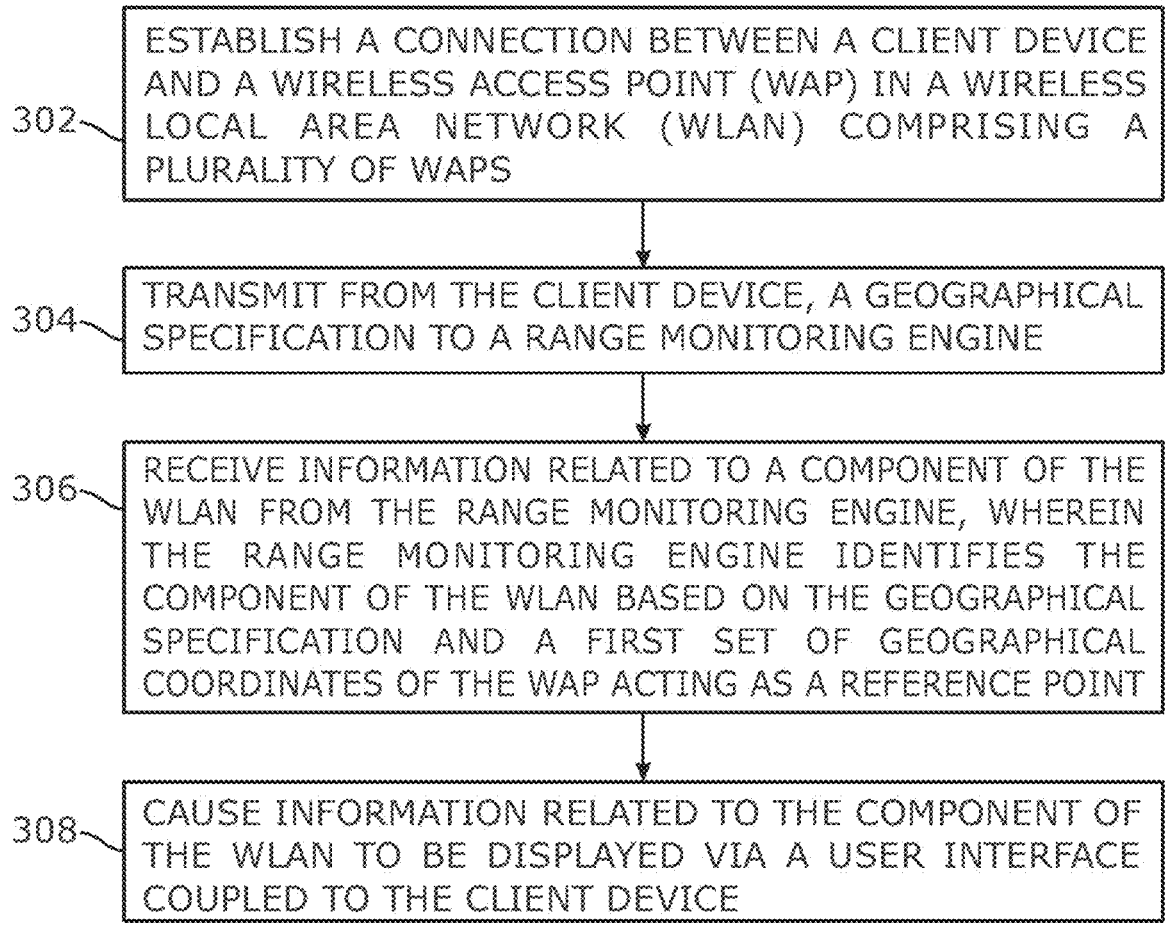
FIG. 3 is a block diagram of an example method of a geographical specification based identification of a component of a wireless local area network.

FIG. 3 is a block diagram of an example method 300 of a geographical specification based identification of a component of a wireless local area network. The method 300, which is described below, may be executed on a device such as client device 118 of FIG. 1. However, other devices may be used as well.

At block 302, a connection may be established between a client device and a wireless access point (WAP) in a wireless local area network (WLAN) comprising a plurality of WAPs. At block 304, the client device may transmit a geographical specification to a range monitoring engine. At block 306, the information related to a component of the WLAN may be received from the range monitoring engine. The range monitoring engine may identify the component of the WLAN based on the geographical specification and a first set of geographical coordinates of the WAP acting as a reference point. At block 308, the information related to the component of the WLAN may be displayed via a user interface coupled to the client device.

Figure 4:
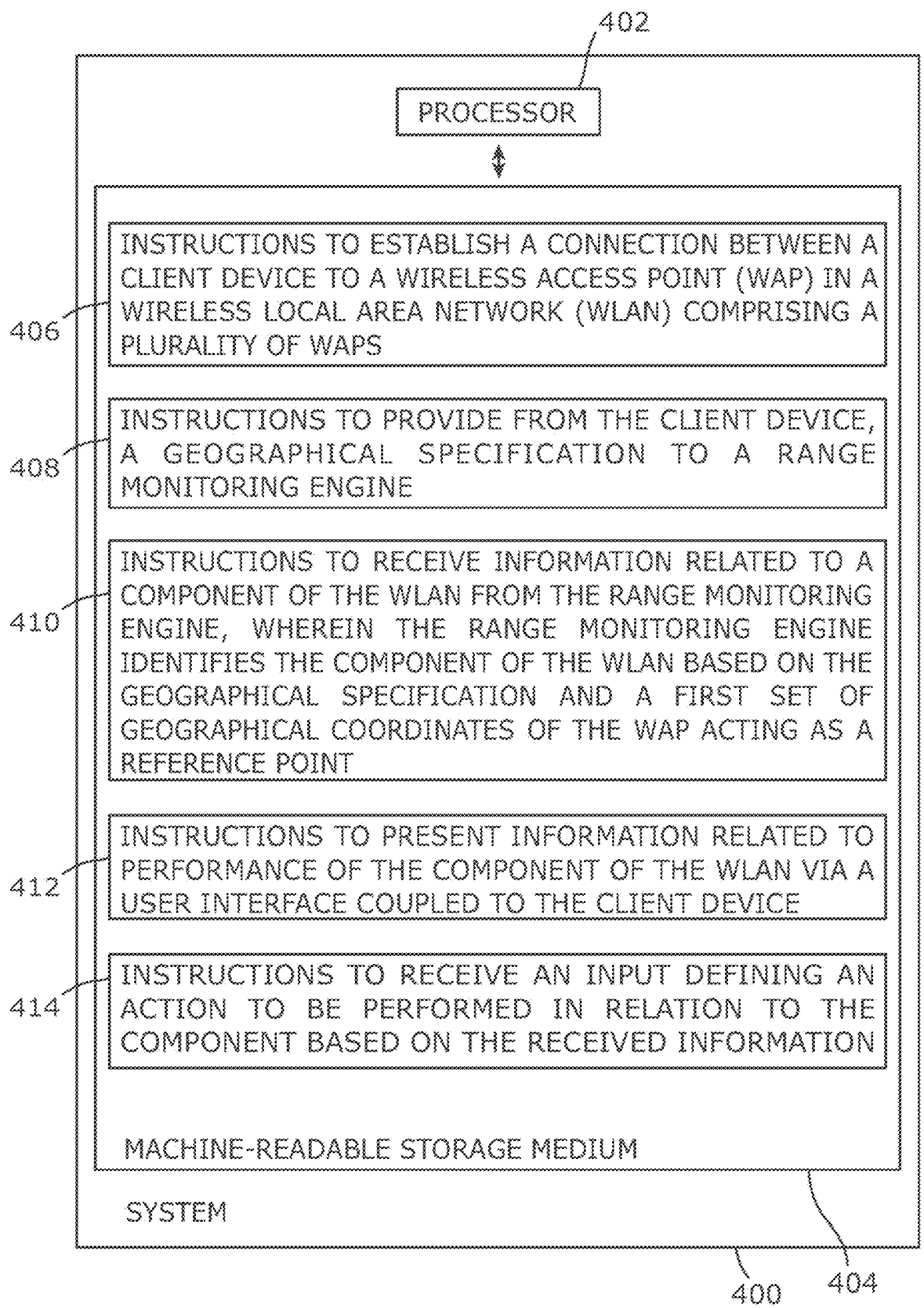
FIG. 4 is a block diagram of an example system including instructions in a machine-readable storage medium for a geographical specification based identification of a component of a wireless local area network.

FIG. 4 is a block diagram of an example system 400 including instructions in a machine-readable storage medium for a geographical specification based identification of a component of a wireless local area network.

System 400 includes a processor 402 and a machine-readable storage medium 404 communicatively coupled through a system bus. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In some examples, machine-readable storage medium 404 may be a non-transitory machine-readable medium. In some examples, machine-readable storage medium 404 may be remote but accessible to system 400.

Machine-readable storage medium 404 may store instructions 406, 408, 410, 412, and 414. In some examples, instructions 406 may be executed by processor 402 to establish a connection between a client device to a wireless access point (WAP) in a wireless local area network (WLAN) comprising a plurality of WAPs. Instructions 408 may be executed by processor 402 to provide from the client device, a geographical specification to a range monitoring engine. Instructions 410 may be executed by processor 402 to receive information related to a component of the WLAN from the range monitoring engine. The range monitoring engine may identify the component of the WLAN based on the geographical specification and a first set of geographical coordinates of the WAP acting as a reference point. Instructions 412 may be executed by processor 402 to present information related to performance of the component of the WLAN via a user interface coupled to the client device. Instructions 414 may be executed by processor 402 to receive an input defining an action to be performed in relation to the component based on the received information.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be understood that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
   establishing a connection between a client device and a wireless access point (WAP) in a wireless local area network (WLAN) comprising a plurality of WAPs;
   transmitting from the client device, a geographical specification to a range monitoring engine;
   receiving, by the client device, information related to a component of the WLAN from the range monitoring engine, wherein the range monitoring engine identifies the component of the WLAN based on the geographical specification and a first set of geographical coordinates of the WAP acting as a reference point; and
   causing information related to the component of the WLAN to be displayed via a user interface coupled to the client device.

2. The method of claim 1, wherein the geographical specification includes a second set of geographical coordinates.

3. The method of claim 2, wherein the second set of geographical coordinates indicates a location of the client device.

4. The method of claim 1, wherein the geographical specification is provided by a user.

5. The method of claim 1, wherein the information relates to performance of the component.

6. The method of claim 1, wherein the component includes a wireless controller in the WLAN.

7. The method of claim 1, wherein the component includes a client device coupled to a WAP amongst the plurality of WAPs in the WLAN.

8. A system comprising:
   a range monitoring engine to:
   receive, from a client device, an input defining a geographical specification, wherein the client device is coupled to a wireless access point (WAP) in a wireless local area network (WLAN) comprising a plurality of WAPs;
   identify a component of the WLAN based on the geographical specification and a first set of geographical coordinates of the WAP acting as a reference point;
   determine information related to the component of the WLAN; and
   provide information related to the component of the WLAN to the client device.

9. The system of claim 8, wherein the component includes a WAP amongst the plurality of wireless access points in the WLAN.

10. The system of claim 8, wherein the first set of geographical coordinates of the WAP include latitude and latitude coordinates of the WAP.

11. The system of claim 8, wherein the geographical specification includes a geographical range from the reference point.

12. The system of claim 11, wherein the client device is located within the geographical range from the reference point.

13. The system of claim 8, wherein the client device includes a mobile device.

14. The system of claim 8, wherein the information related to the component of the WLAN is present in a network management system.

15. A non-transitory machine-readable storage medium comprising instructions, the instructions executable by a processor to:
    establish a connection between a client device to a wireless access point (WAP) in a wireless local area network (WLAN) comprising a plurality of WAPs;
    provide from the client device, a geographical specification to a range monitoring engine;
    receive, by the client device, information related to a component of the WLAN from the range monitoring engine, wherein the range monitoring engine identifies the component of the WLAN based on the geographical specification and a first set of geographical coordinates of the WAP acting as a reference point;
    present information related to performance of the component of the WLAN via a user interface coupled to the client device; and
    receive an input defining an action to be performed in relation to the component based on the received information.

16. The storage medium of claim 15, wherein the reference point includes geographical latitude and longitude of the WAP.

17. The storage medium of claim 15, wherein the component includes the WAP.

18. The storage medium of claim 15, wherein the geographical specification is provided via an interface of the range monitoring engine on the client device.

19. The storage medium of claim 15, wherein the range monitoring engine receives the information related to the component of the WLAN from a network management system.

20. The storage medium of claim 19, wherein the range monitoring engine correlates the information received from the network management system with information from a visual radio frequency (RF) system.

* * * * *